(12) United States Patent
Hwang et al.

(10) Patent No.: US 9,343,734 B2
(45) Date of Patent: May 17, 2016

(54) CARBON/ACTIVE COMPOUND COMPOSITE MATERIAL AND THE MANUFACTURING METHOD THEREOF

(71) Applicant: National Taiwan University of Science and Technology, Taipei (TW)

(72) Inventors: Bing-Joe Hwang, Taipei (TW);
Ming-Yao Cheng, Taipei (TW);
Ju-Hsiang Cheng, Taipei (TW);
Cheng-Liang Hwang, Taipei (TW);
Tse-Ming Chiu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 119 days.

(21) Appl. No.: 13/791,011

(22) Filed: Mar. 8, 2013

(65) Prior Publication Data
US 2013/0320270 A1 Dec. 5, 2013

(30) Foreign Application Priority Data

Jun. 5, 2012 (TW) .............................. 101120187 A

(51) Int. Cl.
*H01M 4/88* (2006.01)
*H01M 4/36* (2006.01)
*H01M 4/13* (2010.01)
*H01M 4/62* (2006.01)

(52) U.S. Cl.
CPC ............... *H01M 4/364* (2013.01); *H01M 4/13* (2013.01); *H01M 4/625* (2013.01); *Y02E 60/122* (2013.01)

(58) Field of Classification Search
CPC ....... H01M 4/134; H01M 4/38; H01M 4/364; H01M 4/386; H01M 4/387

USPC ........................................ 252/182.1; 429/207
See application file for complete search history.

(56) References Cited

U.S. PATENT DOCUMENTS

| | | | |
|---|---|---|---|
| 6,103,393 A | 8/2000 | Kodas et al. |
| 6,143,448 A | 11/2000 | Fauteux et al. |
| 7,094,499 B1 | 8/2006 | Hung |
| 7,745,047 B2 | 6/2010 | Zhamu et al. |

FOREIGN PATENT DOCUMENTS

| CN | 1990144 A * | 7/2007 | ............... B22F 3/10 |
|---|---|---|---|
| CN | 102332573 | 1/2012 | |
| EP | WO 2008-097723 A1 * | 8/2008 | ........ H01M 10/0525 |

OTHER PUBLICATIONS

Cheng et al., "Facile synthesis of SnO2-embodded carbon nanomaterials via glucose-mediated oxidation of Sn particles," J. Mater. Chem. (2011) 21:10705-10710.
Liang et al. "Superior cycle performance of Sn@C/graphene nanocomposite as an anode material for lithium-ion batteries," Journal of Solid State Chemistry (2011) 184:1400-1404.
Office Action in corresponding Taiwanese patent application No. 20120257208.2 issued on Apr. 1, 2015.

* cited by examiner

*Primary Examiner* — Khanh Tuan Nguyen
(74) *Attorney, Agent, or Firm* — Volpe and Koenig, P.C.

(57) ABSTRACT

The present invention provides a multi-dimensional carbon active compound composite comprising a first carbon material, a second carbon material, an active compound, and further a seed material. This composite is capable of storing faradic or non-faradic charges. The produced multi-dimensional carbon can significantly inhibit the aggregation and disintegration of active compounds. Stacked carbon structure also formed a 3-D framework with high electron conductivity, which increases the rate capability of electrode. The green and simple synthesis process has a great potential for mass production. This green energy storage material can be widely applied to lithium secondary ion battery, supercapacitor, and lithium-air battery electrodes.

8 Claims, 9 Drawing Sheets

CARBON/ACTIVE COMPOUND COMPOSITE MATERIAL AND THE MANUFACTURING METHOD THEREOF

The application claims the benefit of Taiwan Patent Application No. 101120187, filed on Jun. 5, 2012, in the Intellectual Property Office of Republic of China, the disclosure of which is incorporated by reference as if fully set forth herein.

FIELD OF THE INVENTION

The present invention relates to a carbon/active compound composite, especially relates to a high-capacity energy storage material with a multi-dimensional structure and the preparation thereof.

BACKGROUND OF THE INVENTION

In the twenty-first century, a century of a science and technology revolution and a rise of environmental awareness, for responding to the rapid evolution of the new generation technology and the green energy products, the requirements and demands for the consumers are also grown, for example, portable 3C products such as mobile phones, personal digital assistant devices, smart phones, notebooks, tablet computers, digital cameras, and transportation such as electric vehicles, hybrid electric vehicles. Among various applications, better performance in terms of the electrical/energy capacity, the endurance life and the output power of the energy storage device are becoming more stringent. To reach the requirement, the design of the energy storage devices needs to be reconsidered. Taking lithium-ion battery as the example, graphite, the choice of negative electrode materials of commercial Li-ion batteries, is able to deliver capacity of 372 mAh $g^{-1}$. The fair capacity with good stability makes it widely applied in 3C electronic products. With the size of the new electronic products goes smaller as well as fulfilling other new applications, Li-ion battery of higher energy density is continuously needed. Obviously graphite no longer satisfies the high-energy-density Li-ion batteries. Therefore high-capacity negative electrode materials like tin (Sn: 998 mAh/g, SnO2: 780 mAh/g) and silicon (4200 mAh/g), able to form alloys with Li, have been investigated for possible replacement of graphite. However, the alloying and de-alloying of the materials with Li during charging and discharging process accompany with drastic volumetric changes, leading to serious breaking/peeling off from current collector of the electrode of Li-ion battery, which is the biggest challenge for bringing into commercialization.

In order to solve or mitigate the drawback mentioning above, there are many methods disclosed in the references and patents. For example, U.S. Pat. No. 6,143,448 (Apr. 15, 1999) discloses a method of using metal salts as the precursor to synthesize a porous high-surface-area electrode material via evaporative drying heating. The synthesized porous material is able to accommodate the volume expansion during charging/discharging process. However, the high surface area electrode material is not suitable for certain electrochemical applications, especially the negative electrode of the lithium ion secondary battery. The method can only have 40-60% active Sn in the synthesized composite materials. Furthermore, the process employs tin-based compounds like tin chloride and tine sulfate, which is not environmental friendly.

U.S. Pat. No. 6,103,393 (Aug. 27, 1998) discloses a method to produce a carbon aerogel/metal composite material. The process uses a commercial porous carbon material as a matrix for absorbing the metal salt precursor. The metal catalyst is embedded inside of the carbon material by the spray pyrolysis. The carbon material is mainly used as a support for metal catalyst such as platinum, silver, palladium, ruthenium, osmium, etc., which is applied for the electrochemical catalytic reaction, for example, fuel cell. The method can only have 40-60% active metal in the synthesized composite materials. Furthermore, the process employs tin-based compounds like tin chloride and tine sulfate, which is not environmentally friendly.

U.S. Pat. No. 7,094,499 (Jun. 10, 2003) discloses a method of using different carbon materials, such as carbon nanotubes, carbon fibers, graphite sheets, as a matrix for metal deposition. Following acidic solution is employed for removal of unstable sediments on the surface of the material. The prepared carbon/metal composite material is applied as the electrode materials of lithium ion batteries. However, the carbon/metal composite material can only deliver a capacity less than 400 mAh/g. Furthermore, the process involves the use of large amounts of the strong acid and the metal chloride, which are not friendly to the environmentally friendly.

U.S. Pat. No. 7,745,047 (Nov. 5, 2007) discloses a method of using micro-scaled graphene oxide sheets as a matrix for preparing various metal/metal alloys carbon composite electrodes by a solid ball milling method, a chemical vapor deposition method or a filtered stack way. The metal/alloy carbon composite are composed by silicon, germanium, tin, lead, bismuth, aluminum, zinc, and the alloys thereof. Although the composite electrode has good electrochemical performance on the lithium ion battery, the composite electrode needs large amounts of graphene oxide as the raw material. Besides, the technique for preparation of graphene oxide disclosed in U.S. Pat. No. 2,798,878 (Jul. 19, 1954) is difficult for mass producing graphene oxide, which may limit the practical uses.

Cheng et al. (Cheng M Y, Hwang C L, Pan C J, Cheng J H, Ye Y S, Rick J F and Hwang B J, Facile synthesis of $SnO_2$-embodded carbon nanomaterials via glucose-mediated oxidation of Sn particles, *J. Mater. Chem.*, 2011, 21, 10705-10710) disclose a method directly use glucose and metallic tin as the precursors to prepare well-dispersed nano-scale tin dioxide/carbon composite as the anode materials of the lithium-ion battery. Cheng et al. note that the micro-scale tin particles are oxidized by the glucose molecules to form tin dioxide nanoparticles of averaged size of 2~5 nm uniformly embedded in the carbon matrix. The nano-scaled tin dioxide/carbon composite is able to deliver a capacity of 521 mAh/g as the Li-ion battery anodes. However, the low degree of graphitization for the carbon matrix limited by the low-melting-point tin, produced by thermal reduction of tin oxide by carbon matrix, needs to be further improved a better way to confine the reduced tin in the carbon matrix is needed.

In summary, an efficient and green method for the Li-ion battery anode of good electrochemical performance and high endurance life is still challenging nowadays. Furthermore the method is needed to satisfy the industrial aspect for possible mass production.

It is therefore attempted by the applicants to deal with the above situation encountered in the prior art.

SUMMARY OF THE INVENTION

The present invention is intended to avoid the aggregation of the active substance in the preparation step and following practical charge-discharge process, to enhance the conductivity of the electrode, to improve the better utilization of the active substance, and to reduce the irreversible reaction caused by the oxide form of the active substance and by high electrode-electrolyte interaction with the nanometer material of high surface area, and to diminish the use of the hazardous chemicals. The present invention involves the use of an active compound, such as silicon, tin, manganese, germanium, antimony, bismuth, zinc, aluminum, cadmium and the thereof combination, and carbohydrates, such as glucose, sucrose, lactose, oligosaccharide and the thereof combination, and carbon-based nanomaterials to form a multi-dimensional carbon/active compound composite via a hydrothermal method.

In a carbon active compound composite includes a plurality of first carbon materials; a plurality of active compounds; and a plurality of second carbon materials.

In a carbon active compound composite preparation process, including steps of: mixing a first carbon material and/or the corresponding derivative, a carbohydrate-like material solution and an active compound to form a mixed solution. The mixed solution is treated to form an intermediate. The intermediate is heated to produce the carbon active compound composite.

Other objects, advantages and efficacy of the present invention will be described in detail below taken from the preferred embodiments with reference to the accompanying drawings.

EXPERIMENTAL MATERIALS AND METHODS

The present invention will be described more specifically with reference in the following embodiments. It is noted that the following descriptions of preferred embodiments of this invention are presented herein for purposes of illustration and description only; it is not intended to be exhaustive or to be limited to the precise invention disclosed.

Figure 1:
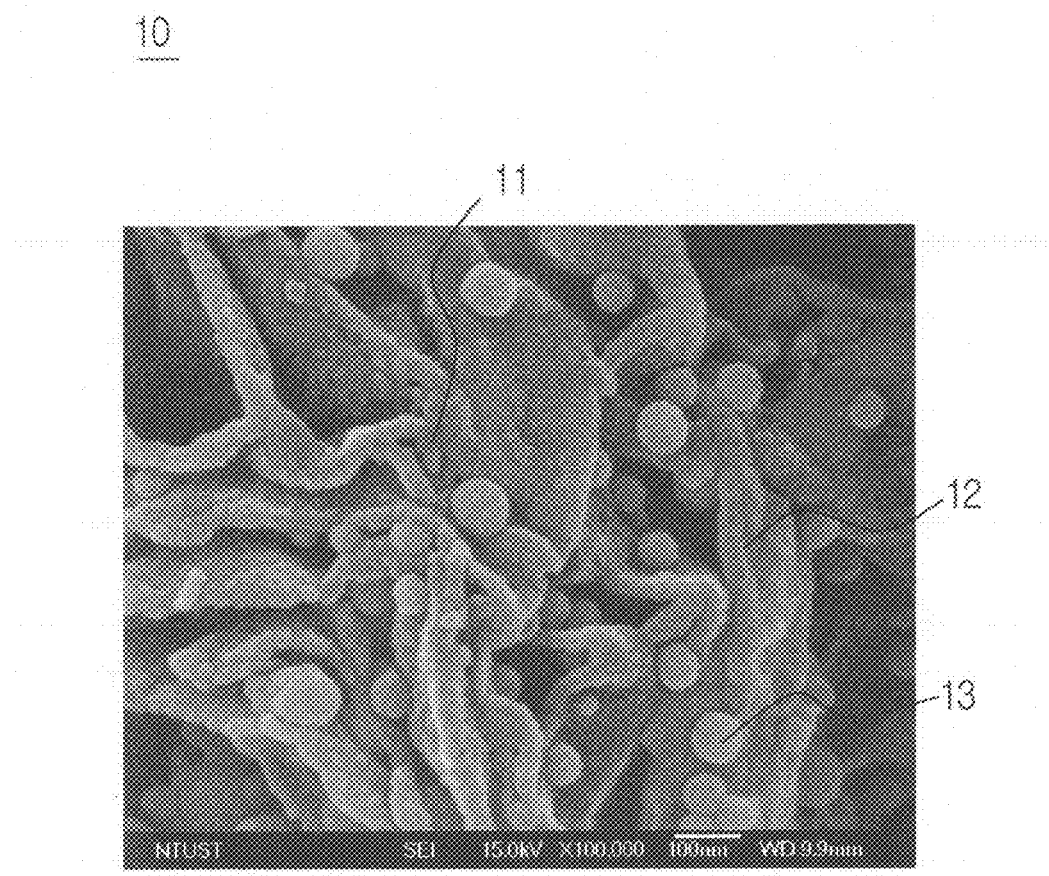
FIG. 1 shows an image of the scanning electron microscope of the present carbon active compound composite.

A scanning electron microscope (SEM) image of a carbon active compound composite 10 of the present invention is shown in FIG. 1. The carbon active compound composite includes a three-dimensional agglutinate carbon material 11, graphene plates 12 and a nano-scaled active particle 13, wherein the graphene plates 12 are well stacked with the aid of agglutinate carbon material 11. The nano-scaled active particle 13 are uniformly dispersed in the agglutinate carbon material 11 and on the surface of the graphene plate 12, to form the carbon active compound composite 10 of the present invention.

The carbon active compound composite 10 is prepared by the hydrothermal method with the following example for illustration. First, a micro-scaled active compound reacts with a glucose solution under hydrothermal condition to form nano-scaled active compound. The nano-scale active compound is well dispersed in the three-dimensional agglutinate carbon material to form an intermediate. In case the graphene oxide sheets dispersed in the glucose solution, the intermediate will be composed of nano-scale active compound, agglutinate carbon material and graphene oxide sheets. Depending on the ratio of the precursor, the graphene oxides sheets may well stacked or dispersed in the agglutinate carbon materials. The nano-scale active compound is well dispersed in the above carbon matrix. In some cases, a seed compound may be added or deposited on graphene oxide sheets before or after the hydrothermal treatment. After hydrothermal treatment and deposition of the seed compound, the intermediate is heat treated at 400° C.~900° C. in a controlled atmosphere for the formation of the carbon active compound composite. The controlled atmosphere may compose of hydrogen for the enhancement of the conductivity of the carbon active compound composite and for the decrease of the first cycle irreversible capacity. The graphene oxide plays an important role in the size reduction of the active compound, since the agglomeration phenomenon of the active compound is effectively inhibited during the heat treatment. The resulting electrochemical performance and cycle life of the carbon active compound composite are improved as well. For the case with the seed materials, which may be incorporated with the precursor solution or pre-deposited on the graphene oxide, the active compound may be deposited on as well. During heat treatment and/or charge/discharge process, the active compound will be confined on the seed materials, which are able to provide excellent performance and cycle life.

Embodiment 1

Figure 2A:
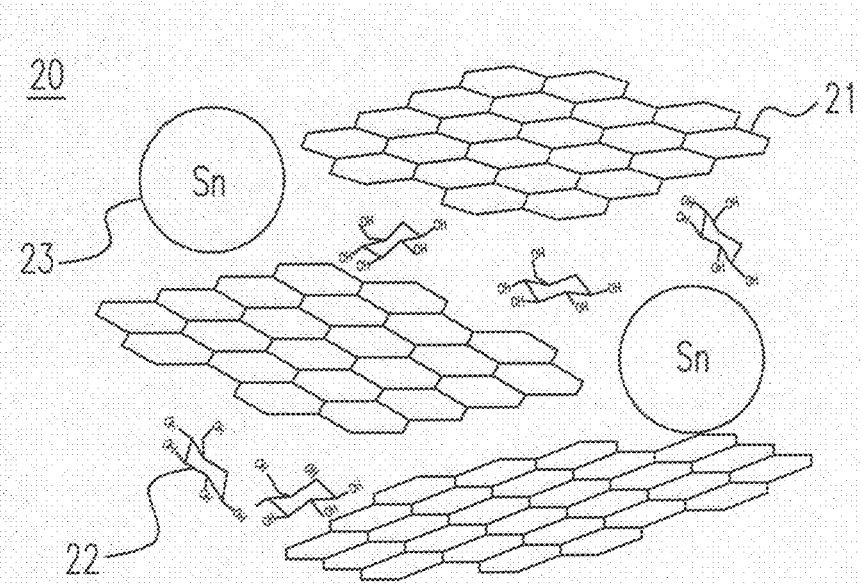
FIGS. 2(a) and 2(b) respectively show a schematic diagram and a scanning electron microscope image of the initial reaction.
Figure 2B:
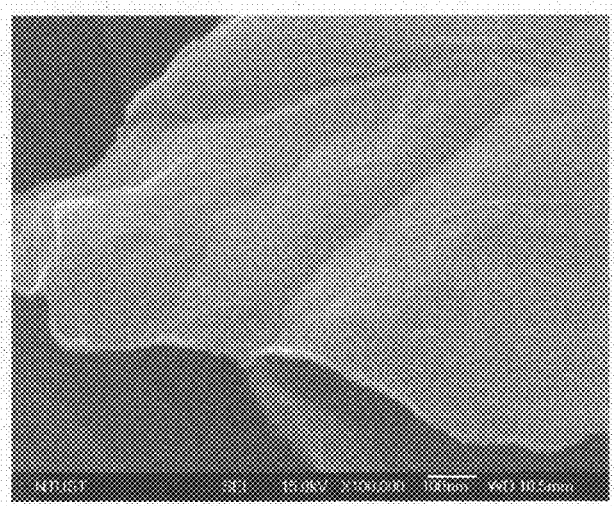
Figure 3A:
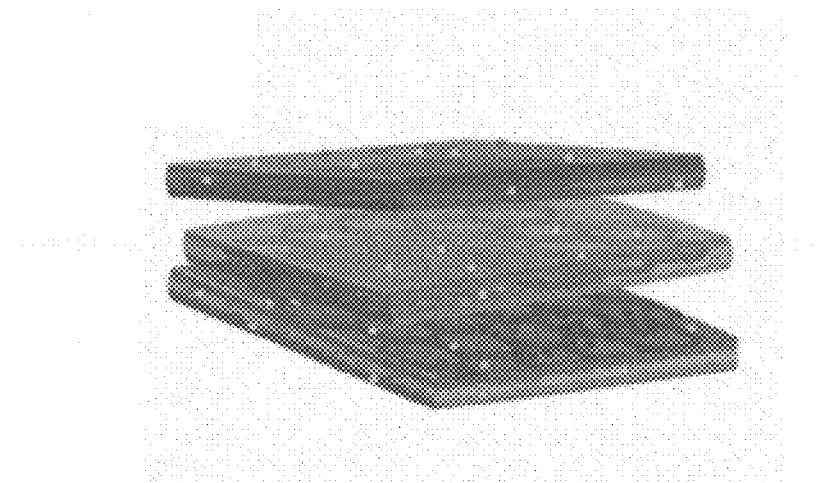
FIGS. 3(a) and 3(b) respectively show a schematic diagram and a scanning electron microscope image after the hydrothermal method.
Figure 3B:
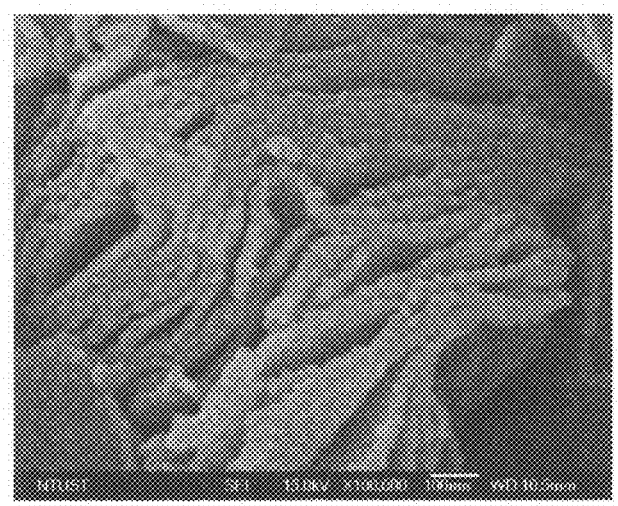
Figure 4A:
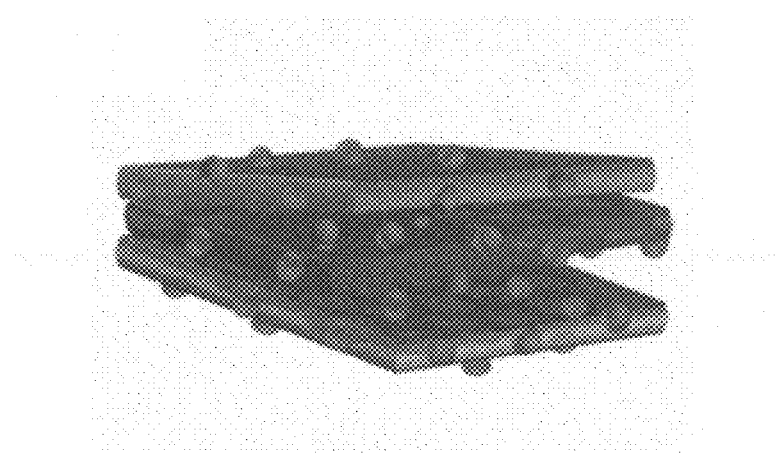
FIGS. 4(a) and 4(b) respectively show a schematic diagram and a scanning electron microscope image after the calcination.
Figure 4B:
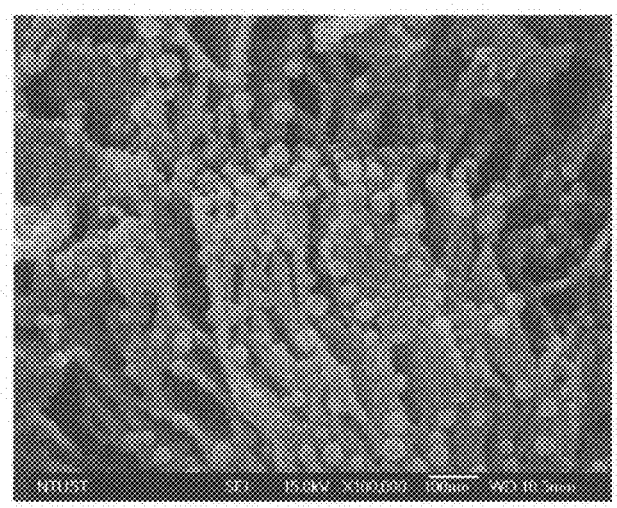

First, 2.5 g graphite, 2.5 g sodium nitrate ($NaNO_3$) and 115 mL sulfuric acid ($H_2SO_4$) are added in the 500 mL ice-bath flask and mixed uniformly, and then stirred. Adding 7.5 g potassium permanganate ($KMnO_4$) slowly while stirring and prevent the reaction temperature exceeds 20° C. The ice-bath flask is moved to the 35° C. water bath for 30 minutes and then added 115 mL de-ionized water into the ice-bath flask slowly, and the reaction temperature was raised immediately to 98° C. and the reaction was performed for 15 minutes. Following 350 mL de-ionized water and 23 mL, 35% hydrogen peroxide were added into the flask until the solution is cooled down. The cooled product is rinsed by dialysis until pH of the solution, the graphene oxide solution 21, close to 7 (shown in FIGS. 2(a) and 2(b)). Taking 10 mL, 1 wt % graphene oxide solution 21 and 3.6 g glucose 22 (>95%; preferably, D(+) glucose) and stirring for 90 minutes to fully dissolve the glucose. Adding 1 g micro-scaled tin powder 23 (>99%; Sigma-Aldrich) and stirring for 30 minutes to form a mixed solution. The mixed solution is moved to a 100 mL reactor for hydrothermal treatment at 180° C. (other temperature may be adopted as well, ex: 150° C. or 220° C.) for 5 hours. After the reaction completion, the black precipitate is collected and rinsed with 500 mL de-ionized water is dried to obtain a dried powder (shown in FIGS. 3(a) and 3(b)). The dried powder (about 2.25 g) is moved to a controlled environment containing gas mixture of 5% $H_2$ and 95% Ar. The dried power is then heated treated at 550° C. for the required time to obtain a carbon active compound composite having different metal particle size, as shown in FIGS. 4(a) and 4(b). The weight ratio of the graphene oxide is about 5% of the total carbon active compound composite.

Figure 5:
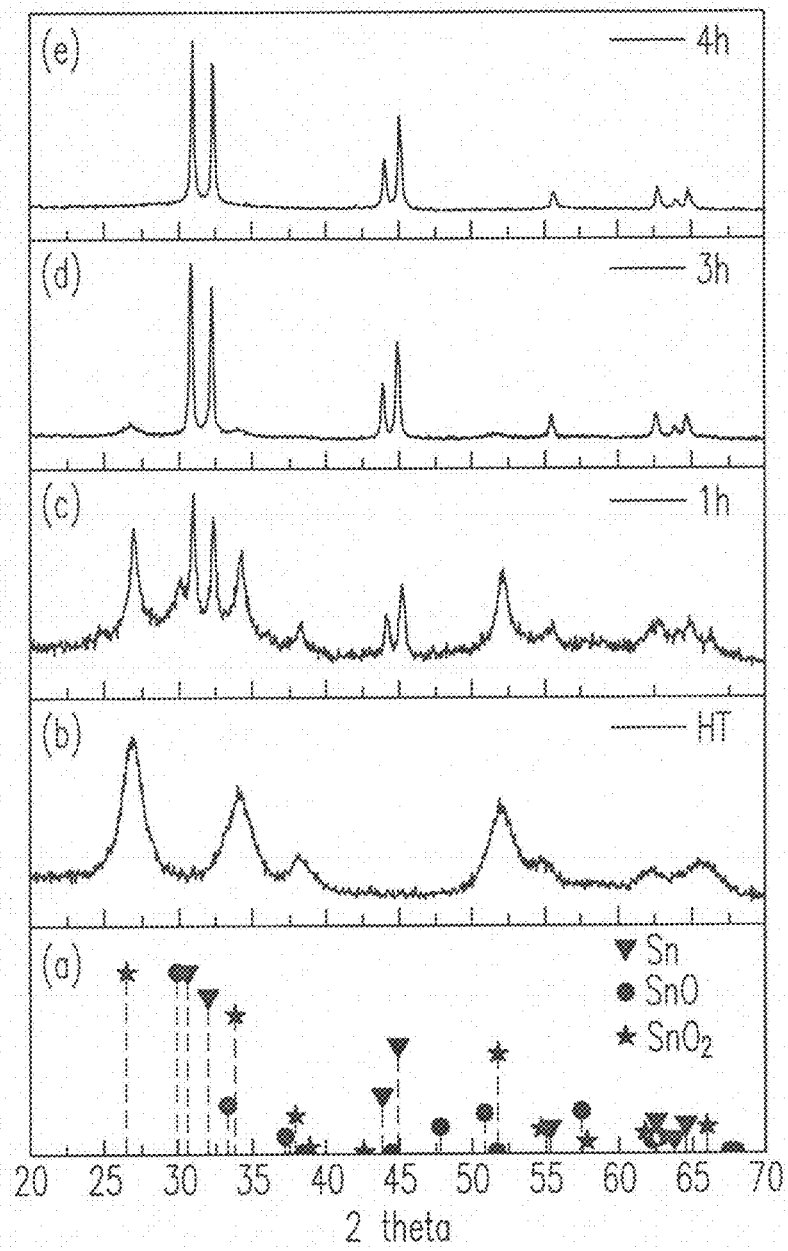
FIG. 5(a) shows an X-ray diffraction pattern of the tin metal, the tin oxide and the tin dioxide.
FIG. 5(b) shows an X-ray diffraction pattern of the tin metal, the tin oxide and the tin dioxide in the carbon active compound composite before calcination.
FIGS. 5(c) to 5(e) respectively show the X-ray diffraction pattern of the tin powder in different timing of the calcination.

The X-ray diffraction (XRD) index of the tin metal, the tin oxide and the tin dioxide are shown in FIG. 5(a), and the XRD patterns of the prepared carbon active compound composite with various heat treatment time are shown in FIG. 5(b)~5(d). For the sample without heat treatment, the form of the active compound in the intermediate is tin dioxide, as shown in FIG. 5(b). After 1-hour heating, the form of the active compound composes of tin metal, tin oxide and tin dioxide, as shown in FIG. 5(c). After 4-hour heating, there is only tin metal observed as the active compound, as shown in FIG. 5(d). The experiments confirm that the nano-scaled tin dioxide is converted into the nano-scaled tin metal, which will significantly decrease the irreversible capacity of the carbon active compound composite.

Figure 6A:
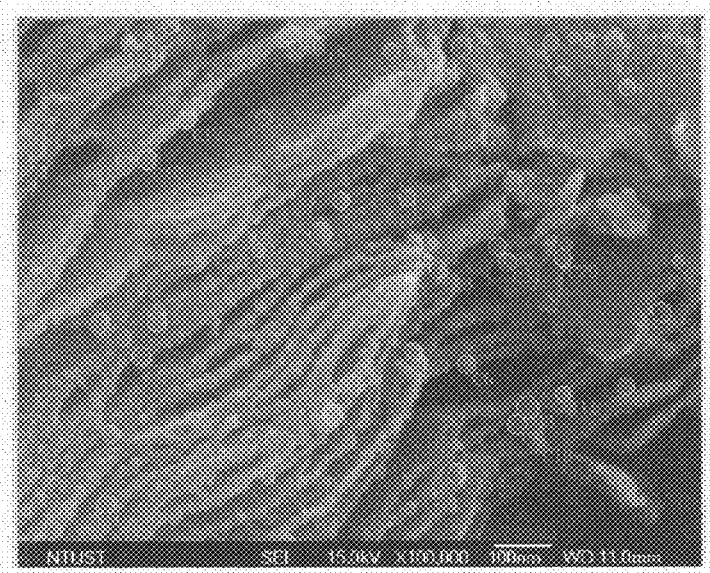
FIGS. 6(a) and 6(b) respectively show a scanning electron microscope image and a distribution diagram of the tin particle size after calcination for an hour.
Figure 6B:
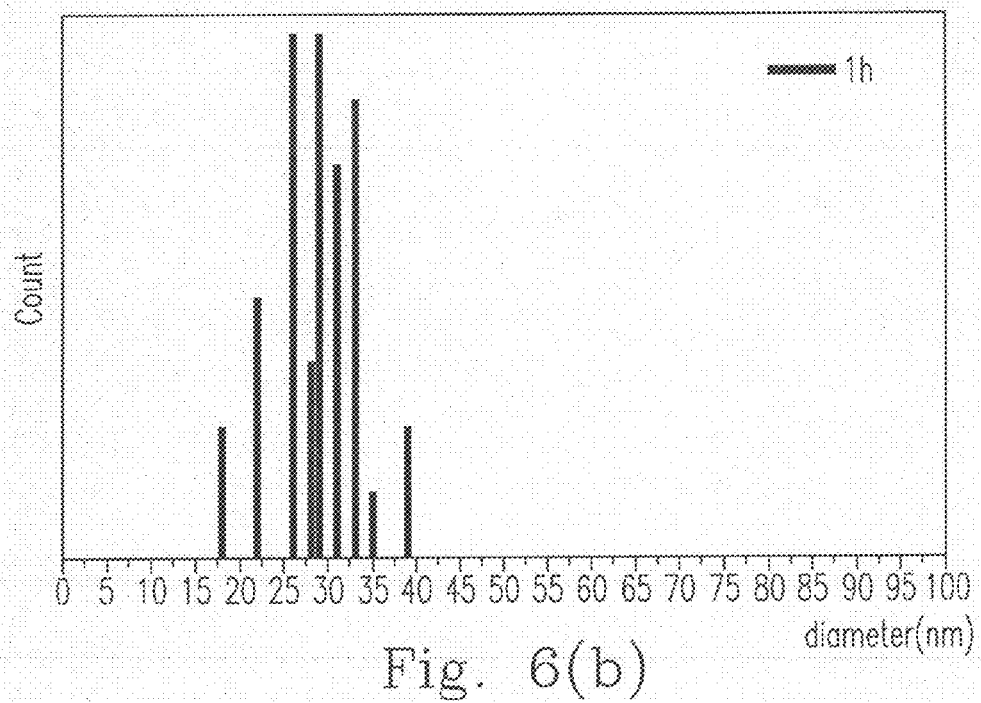
Figure 6C:
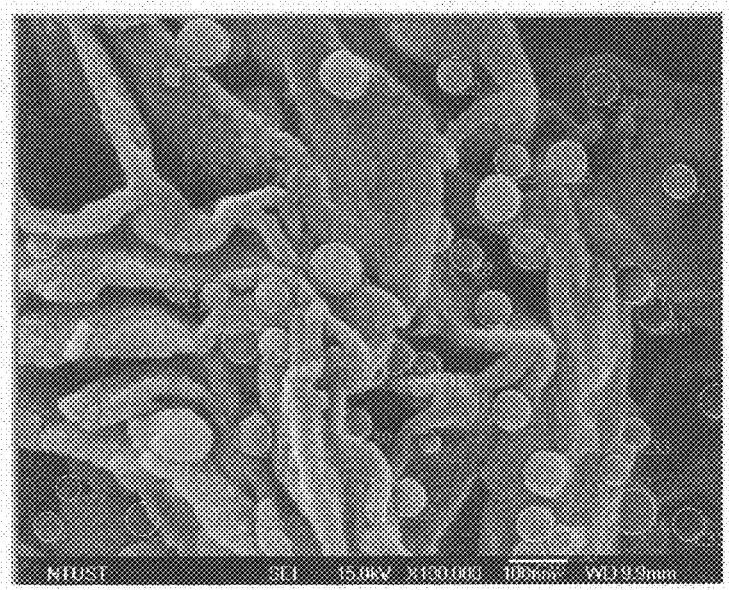
FIGS. 6(c) and 6(d) respectively show a scanning electron microscope image and a distribution diagram of the tin particle size after calcination for four hours.
Figure 6D:
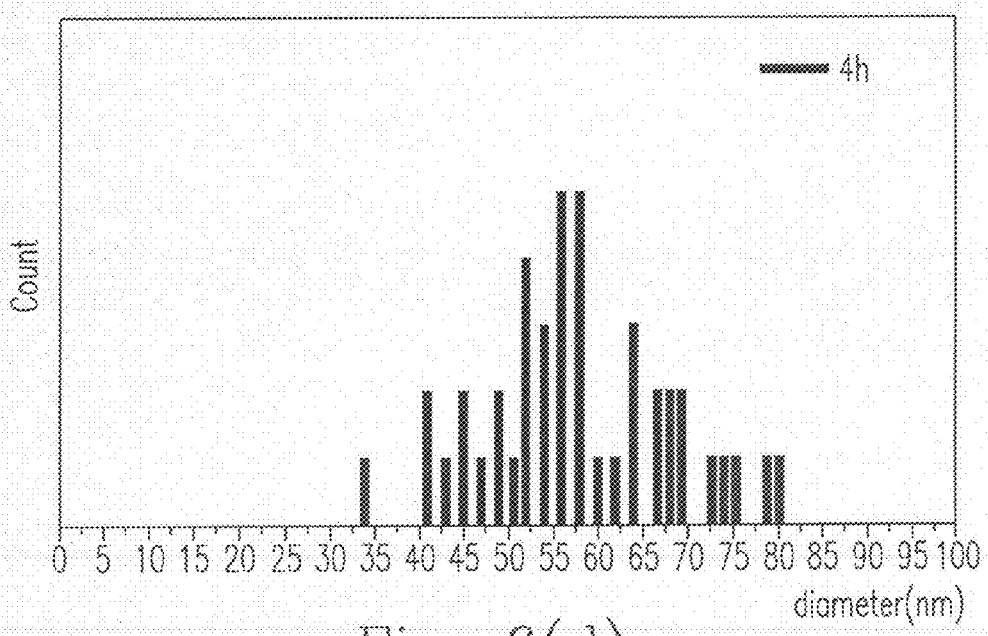

The images of the above carbon active compound composite are shown in FIGS. 6(a)~6(d). Clearly the average particle size of the tin is 28.73 nm for the 1-hour heated carbon active compound composite, as shown in FIGS. 6(a) and 6(b). After 4-hour heat treatment, the average particle size increases to 56.91 nm, as shown in FIGS. 6(c) and 6(d).

Embodiment 2

3.6 g glucose (>95%; preferably, D(+) glucose) is added into 10 mL de-ionized water and stirred for 90 minutes to fully dissolve the glucose. Adding 1 g micro-scaled tin powder (>99%; Sigma-Aldrich) and stirring for 30 minutes to form a mixed solution. The mixed solution is moved to a 100 mL reactor for hydrothermal treatment at 180° C. for 5 hours. After the reaction completion, the black precipitate is rinsed, and dried at 80° C. overnight to obtain a dried powder. The dried powder (about 2.25 g) is moved to a controlled environment of pure $N_2$ for heating at 400° C. for 4 hours to obtain a nano-scaled tin dioxide carbon composite.

Embodiment 3

3.6 g glucose (>95%; preferably, D(+) glucose) is added into 10 mL de-ionized water and stirred for 90 minutes to fully dissolve the glucose. Adding 1 g micro-scaled tin powder (>99%; Sigma-Aldrich) and stirring for 30 minutes to form a mixed solution. The mixed solution is moved to a 100 mL reactor for hydrothermal treatment at 180° C. for 5 hours. After the reaction completion, the black precipitate is rinsed and dried at 80° C. in an oven overnight to obtain a dried powder. The dried powder (about 2.25 g) is moved to a controlled environment containing gas mixture of 5% $H_2$ and 95% Ar for heating at 600° C. for 4 hours to obtain a nano-scaled tin metal/carbon composite.

Embodiment 4

Figure 7A:
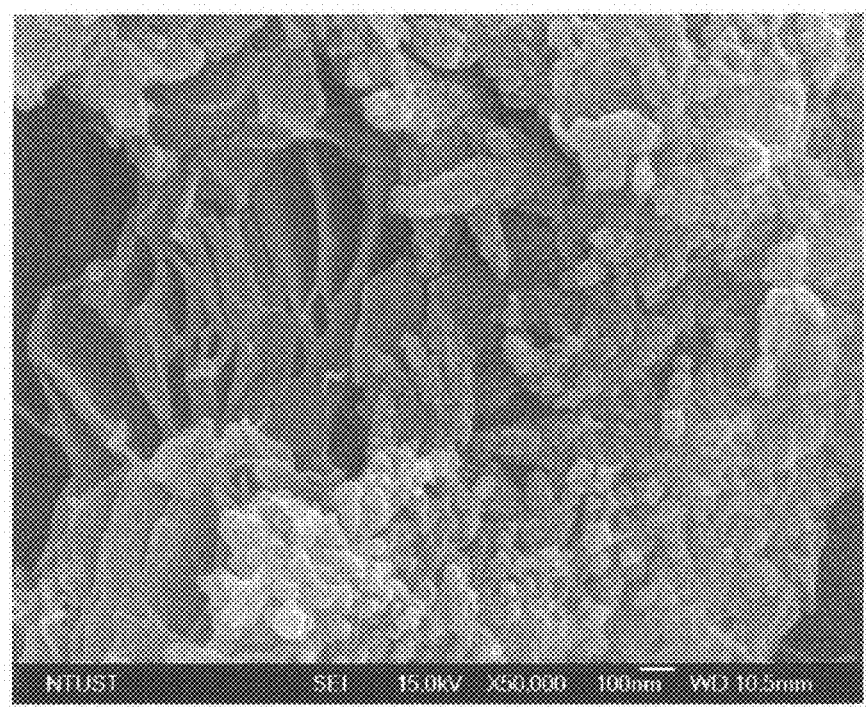
FIGS. 7(a) and 7(b) respectively show a scanning electron microscope image of the carbon active compound composite after the hydrothermal method and the calcinations.
Figure 7B:
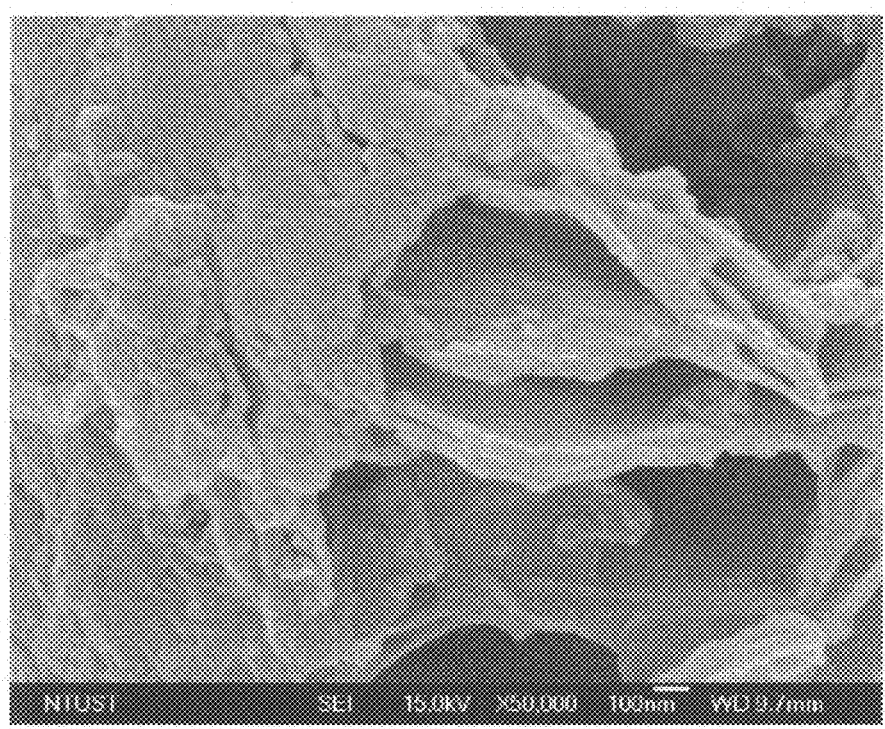

First, 2.5 g graphite, 2.5 g sodium nitrate ($NaNO_3$) and 115 mL sulfuric acid ($H_2SO_4$) are added in the 500 mL ice-bath flask and mixed uniformly, and then stirred. Adding 7.5 g potassium permanganate ($KMnO_4$) slowly while stirring and prevent the reaction temperature exceeds 20° C. The ice-bath flask is moved to the 35° C. water bath for 30 minutes and then added 115 mL de-ionized water into the ice-bath flask slowly, and the reaction temperature was raised immediately to 98° C. and the reaction is performed for 15 minutes. Following 350 mL de-ionized water and 23 mL, 35% hydrogen peroxide were added into the flask until the solution is cooled down. The cooled product is rinsed by dialysis until pH of the solution, the graphene oxide solution, close to 7. Taking 10 mL, 1 wt % graphene oxide solution, 3.6 g glucose (>95%; preferably, D(+) glucose) and 1.2 g urea (>99.5%; ACROS), and stirring for 90 minutes to fully dissolve the glucose. Adding 1 g micro-scaled (50 um) manganese metal (>99%; Sigma-Aldrich) and stirring for 30 minutes to form a mixed solution. The mixed solution is moved to a 100 mL reactor for hydrothermal treatment at 180° C. (other temperature may be adopted as well, ex: 150° C. or 220° C.) for 5 hours. After the reaction completion, the black precipitate is rinsed and dried at 80° C. (as shown in FIG. 7(a)). After X-ray diffraction analysis, the form of the active compound in the intermediate is nano-scaled manganese carbonate (FIG. 8(a)). The 2.25 g dried powder is moved to a controlled environment of pure $N_2$. The dried power is then heated treated at 400° C. for required time. The manganese carbonate is converted to manganese oxide (XRD shown in FIG. 8(b)), as shown in FIG. 7(b).

Figure 8:
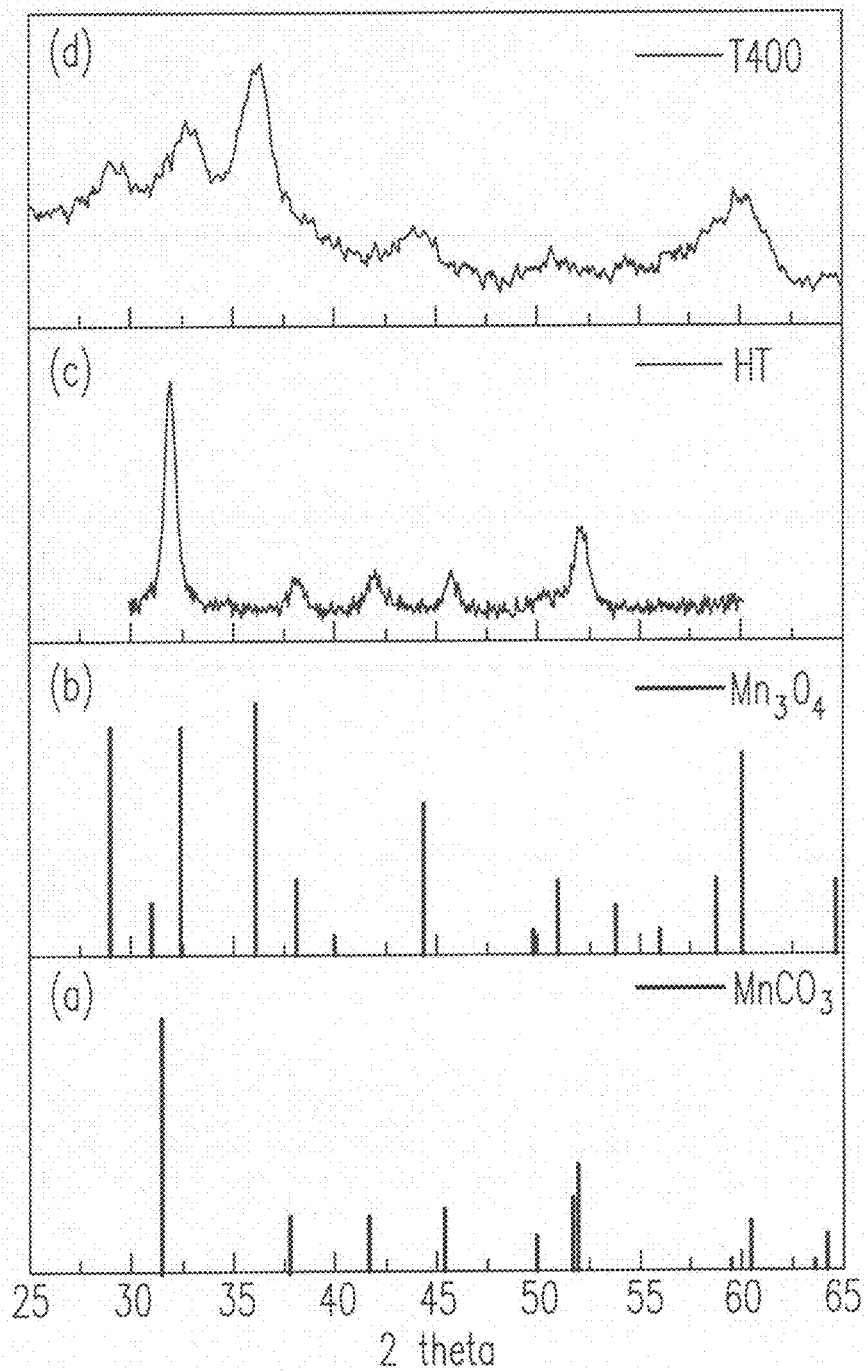
FIGS. 8(a) and 8(b) respectively show the X-ray diffraction diagram of the manganese carbonate and the manganese oxide.
FIGS. 8(c) and 8(d) respectively show the X-ray diffraction diagram of the manganese powder before and after the calcination.

The above-mentioned carbon active composite after calcination is shown in FIG. 8. The manganese of the carbon active composite is existed as the manganese carbonate before calcination. However, the manganese is converted from manganese carbonate to manganese oxide after calcination at 400° C. for 4 to 10 hours, as shown in FIG. 8(d).

There are further Embodiments provided as follows.

Embodiment 1

In a carbon active compound composite includes a plurality of first carbon materials; a plurality of active compounds; and a plurality of second carbon materials prepared from a plurality of carbohydrate materials as precursors that are able to couple with the active compounds and the first carbon materials, and themselves to form a larger mass.

Embodiment 2

In the carbon active compound composite according to the above-mentioned embodiment 1, the first carbon materials are selected from a group consisting of a zero-dimensional carbon and the derivatives thereof, a one-dimensional carbon and the derivatives thereof, a two-dimensional carbon and the derivatives thereof, and a combination thereof.

Embodiment 3

In the carbon active compound composite according to the above-mentioned embodiment 2, the derivatives include the said zero-, one- and two-dimensional carbons with surface and/or structural modification.

Embodiment 4

In the carbon active compound composite according to the above-mentioned embodiment 3, the zero-dimensional carbon is one selected from a group consisting of a carbon capsule, a carbon black, an activated carbon, the corresponding derivatives thereof, and a combination thereof. The one-dimensional carbon is one selected from a group consisting of a carbon nanotube, a graphite tube, a carbon fiber, the corresponding derivatives thereof, and a combination thereof. The two-dimensional carbon is one selected from a group consisting of a graphene, a natural graphite, the corresponding derivatives thereof and a combination thereof.

Embodiment 5

In the carbon active compound composite according to the above-mentioned embodiment 1, each of the plurality of active compounds is selected from a group consisting of silicon, tin, manganese, germanium, antimony, bismuth, zinc, aluminum, cadmium, and the combination thereof in a formed of alloy, an oxide, a carbide, a carbonate, a phosphate and a complex, and the active compounds are well dispersed throughout the carbon active compound composite.

Embodiment 6

In the carbon active compound composite according to the above-mentioned embodiment 5, the active compounds have an averaged diameter ranging between 1 nanometer~1000 nanometer. The weight percent of the active compounds in the carbon active compound composite ranges from 1%~99%. Preferably, the active compounds have an averaged diameter ranging between 1 nanometer~100 nanometer and the weight percent of the active compounds in the carbon active compound composite ranges from 20%~97%.

Embodiment 7

In the carbon active compound composite according to the above-mentioned embodiment 1, the carbohydrate-like materials are selected from a group consisting of a monosaccharide, a disaccharide, an oligosaccharide, a polysaccharide and a combination thereof.

Embodiment 8

In the carbon active compound composite according to the above-mentioned embodiment 7, the monosaccharide is one selected from a group consisting of a ribose, a deoxyribose, a glucose, a fructose, a galactose and a combination thereof. The disaccharide is one selected from a group consisting of a sucrose, a lactulose, a lactose, a maltose and a combination thereof.

Embodiment 9

In the carbon active compound composite according to the above-mentioned embodiment 1, further including a plurality of seed materials prepared with the first carbon materials before preparation of the carbon active compound composite.

Embodiment 10

In the carbon active compound composite according to the above-mentioned embodiment 9, the seed materials are prepared individually and added during preparation of the carbon active compound composite.

Embodiment 11

In the carbon active compound composite according to the above-mentioned embodiment 9, the seed materials are prepared in situ in the preparation process of the carbon active compound composite.

Embodiment 12

In the carbon active compound composite according to the above-mentioned embodiment 1, the first and the second carbon materials are able to stabilize the active compounds.

Embodiment 13

In a carbon active compound composite preparation process, including steps of: mixing a first carbon material and/or the corresponding derivative thereof, a carbohydrate-like material solution and an active compound to form a mixed solution. The mixed solution is treated to form an intermediate. The intermediate is heated to produce the carbon active compound composite.

Embodiment 14

In the carbon active composite preparation process according to the above-mentioned embodiment 13, the active compound is a bulk material.

Embodiment 15

In the carbon active composite preparation process according to the above-mentioned embodiment 14, further including a step of pulverizing the bulk active compounds chemically into a plurality of small-scaled active particles of various forms.

Embodiment 16

In the carbon active composite preparation process according to the above-mentioned embodiment 15, the small-scaled active compounds of various forms are reduced in a controlled environment having a gas to the one of zero valence state. The gas for the controlled environment is selected from a group consisting of a nitrogen, an argon, a carbon monoxide, a hydrogen, a hydrazine, a lithium vapour, a sodium vapour, a potassium vapour, a magnesium vapour and a combination thereof.

Embodiment 17

In the carbon active composite preparation process according to the above-mentioned embodiment 13, further including a step of carbonizing the reacted carbohydrate-like materials and the derivates of the first carbon material.

Embodiment 18

In the carbon active composite preparation process according to the above-mentioned embodiment 13, the mixed solution is treated in a gas-tight environment under a first temperature ranged from 100° C. 400° C. for the formation of the intermediate.

Embodiment 19

In the carbon active composite preparation process according to the above-mentioned embodiment 13, the intermediate is heated at a second temperature ranged from 400° C.~900° C. for the formation of the carbon active compound composite.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A carbon active compound composite, comprising:
   a plurality of first carbon materials being one selected from a group consisting of a zero-dimensional carbon and the derivatives thereof, a one-dimensional carbon and the derivatives thereof, a two-dimensional carbon and the derivatives thereof, and a combination thereof;
   a plurality of active compounds; and
   a plurality of second carbon materials coated on the plurality of active compounds and coupled with the plurality of first carbon materials so that the plurality of active compounds are uniformly dispersed in the plurality of second carbon materials and on the surface of the plurality of first carbon materials, wherein the plurality of second carbon materials are different from the plurality of first carbon materials.

2. The carbon active compound composite according to claim 1, wherein the derivatives include the zero-, one- and two-dimensional carbons with surface and/or structural modification.

3. The carbon active compound composite according to claim 2, wherein the zero-dimensional carbon is one selected from a group consisting of a carbon capsule, a carbon black, an activated carbon, the corresponding derivatives thereof, and a combination thereof; the one-dimensional carbon is one selected from a group consisting of a carbon nanotube, a graphite tube, a carbon fiber, the corresponding derivatives thereof, and a combination thereof; and the two-dimensional carbon is one selected from a group consisting of a graphene, a natural graphite, the corresponding derivatives thereof and a combination thereof.

4. The carbon active compound composite according to claim 1, wherein each of the plurality of active compounds is selected from a group consisting of silicon, tin, manganese, germanium, antimony, bismuth, zinc, aluminum, cadmium, and the combination thereof in a form of alloy, an oxide, a carbide, a carbonate, a phosphate and a complex, and the active compounds are well dispersed throughout the carbon active compound composite.

5. The carbon active compound composite according to claim 4, wherein the active compounds have an average diameter ranging between 1 nanometer~1000 nanometer, and the weight percent of the active compounds in the carbon active compound composite ranges from 1%~99%.

6. The carbon active compound composite according to claim 1, wherein the carbohydrate materials are selected from a group consisting of a monosaccharide, a disaccharide, an oligosaccharide, a polysaccharide and a combination thereof.

7. The carbon active compound composite according to claim 6, wherein the monosaccharide is one selected from a group consisting of a ribose, a deoxyribose, a glucose, a fructose, a galactose and a combination thereof, and the disaccharide is one selected from a group consisting of a sucrose, a lactulose, a lactose, a maltose and a combination thereof.

8. The carbon active compound composite according to claim 1, wherein the first and the second carbon materials are able to stabilize the active compounds.

* * * * *